(12) United States Patent
Schatz et al.

(10) Patent No.: US 11,835,139 B2
(45) Date of Patent: Dec. 5, 2023

(54) TRAILING PISTON HAVING A SUPPORT LIP

(71) Applicant: Ritter GmbH, Schwabmünchen (DE)

(72) Inventors: Stephan Schatz, Scheidegg (DE);
Sebastian Kertzscher, Lagerlechfeld (DE); Oliver Wolf, Untermeitingen (DE); Frank Finis, Augsburg (DE)

(73) Assignee: Ritter GmbH, Schwabmunchen (DE)

( * ) Notice: Subject to any disclaimer, the term of this patent is extended or adjusted under 35 U.S.C. 154(b) by 0 days.

(21) Appl. No.: 17/682,545

(22) Filed: Feb. 28, 2022

(65) Prior Publication Data

US 2022/0325799 A1 Oct. 13, 2022

(30) Foreign Application Priority Data

Apr. 7, 2021 (DE) ..................... 10 2021 108 642.6

(51) Int. Cl.
*F16J 15/3292* (2016.01)
*F16J 1/04* (2006.01)

(52) U.S. Cl.
CPC ............. *F16J 15/3292* (2013.01); *F16J 1/04* (2013.01)

(58) Field of Classification Search
CPC .......... F16J 1/04; F16J 1/06; B05C 17/00576; B05C 17/00579; B65D 83/0005
See application file for complete search history.

(56) References Cited

U.S. PATENT DOCUMENTS 8,505,785 B2 * 8/2013 Helmenstein ...... B65D 83/0005
222/326

FOREIGN PATENT DOCUMENTS

| DE | 202008005097 U1 | 10/2009 | |
|---|---|---|---|
| DE | 102010048062 A1 | 12/2011 | |
| DE | 102017203241 A1 | 8/2018 | |
| DE | 202018003641 U1 | 8/2018 | |
| EP | 2520375 B1 | 7/2014 | |
| EP | 3520905 A1 * | 8/2019 | ....... B05C 17/00579 |

* cited by examiner

*Primary Examiner* — Michael Leslie
(74) *Attorney, Agent, or Firm* — Kolitch Romano Dascenzo Gates LLC

(57) ABSTRACT

A self-sealing and self-centering piston has a domed piston plate and a substantially cylindrical skirt section. The skirt section joins the rear of the piston plate. A gap having a depth is formed between a first portion of the skirt section and a front lamella. A rear lamella adjoins the front lamella. In addition, a second section of the skirt section has a first seal and a second seal.

7 Claims, 5 Drawing Sheets

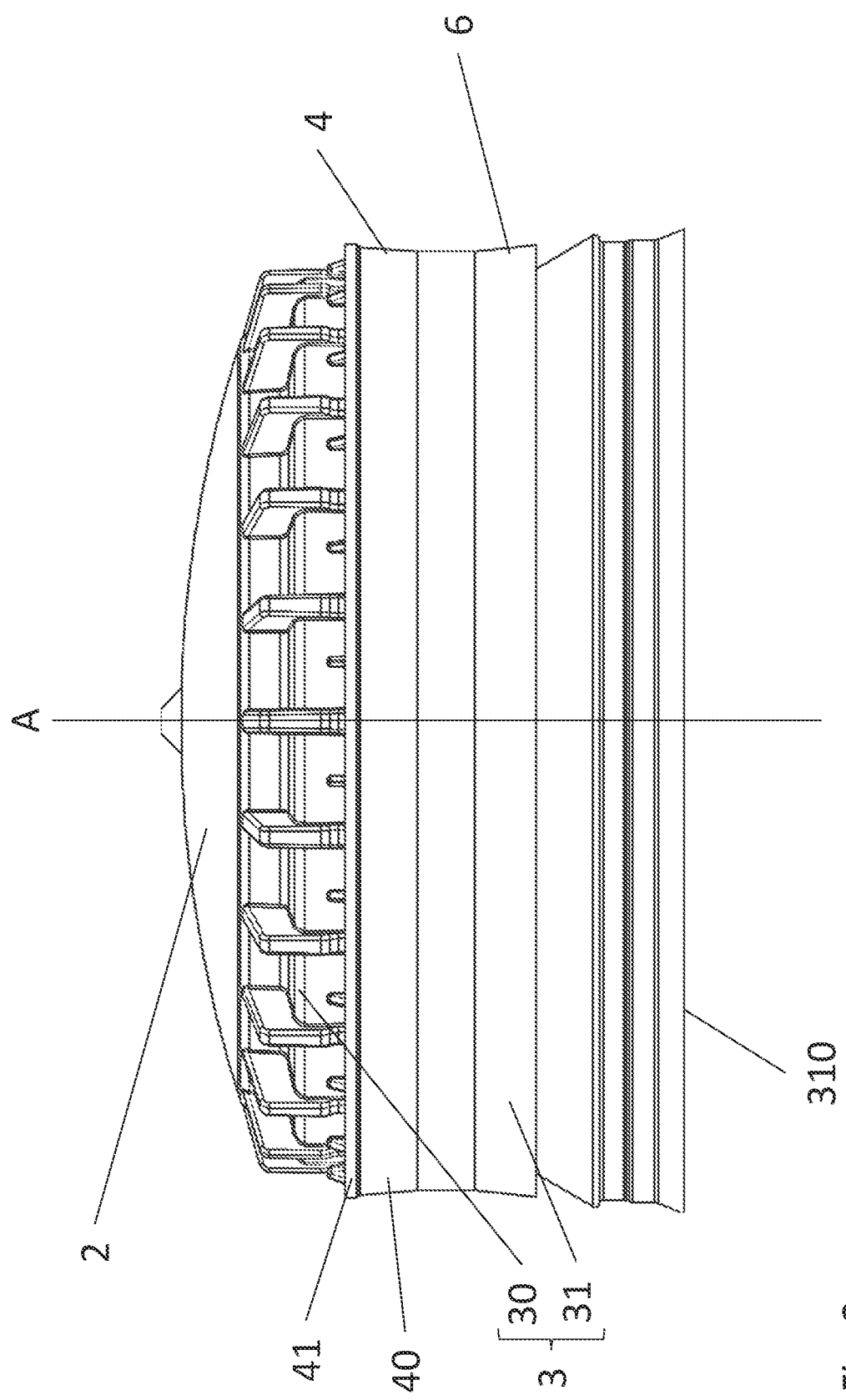

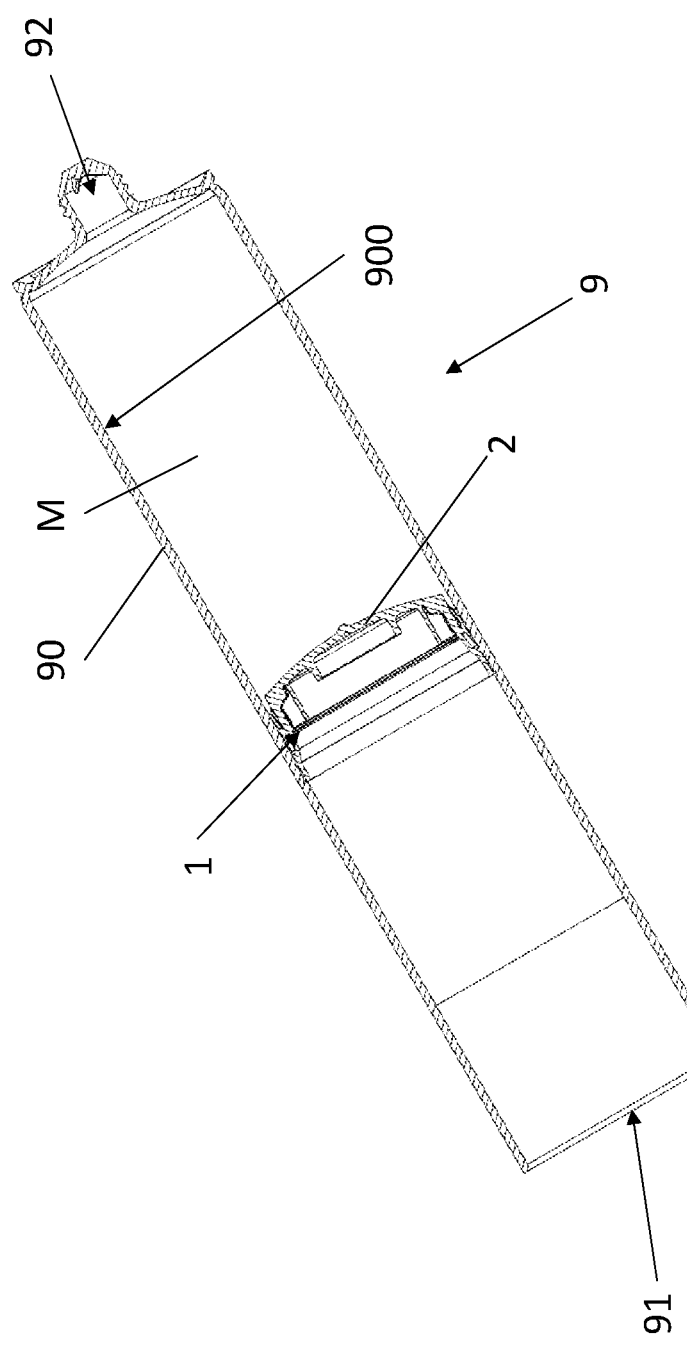

TRAILING PISTON HAVING A SUPPORT LIP

FIELD

The application relates to sealing and dispensing pistons for insertion into the interior of a cartridge containing a paste or liquid filling substance.

INTRODUCTION

Conventional cartridge sealing and dispensing pistons usually consist of a piston plate extending across the cartridge cross-section and a cylindrical skirt section extending rearwardly therefrom. A sealing lip is formed on the outer circumference of the piston, which contacts the inner wall of the cartridge. For example, a forward-facing sealing lip can be provided at the front region of the piston, which is pressed more strongly against the cartridge inner wall by the counterpressure of the filling material as the squeezing pressure increases, so that the seal is automatically reinforced and a better seal is achieved. In addition, one or more axially spaced, rearward-facing sealing lips can be provided. Such a piston is known, for example, from patent specification EP 2 520 375 B1.

With such designs, inserting the piston into the open rear end of the cartridge may cause problems. In particular, if the piston is not positioned exactly centrally, the forward-facing sealing lip can catch on or interfere with the rear edge of the cartridge wall. In addition, the piston can tilt during the insertion movement and catch on the cartridge wall. This can lead to malfunctions during the insertion process as well as damage to the sealing lip, resulting in an inadequate seal of the piston against the wall of the cartridge and the filling material filled in the cartridge may react with air penetrating through the space between the wall and the piston.

Usually, in the setting process, the pistons are inserted into a the rear opening of a cartridge by mechanical force or by compressed air (hydraulic insertion). When dispensing filling material, the pistons are actuated mechanically or by compressed air (hydraulically) in order to discharge the filling material, e.g. using a discharge gun. During the setting process, the pressure within the filling substance increases. The cartridge may deform accordingly. When the dispensing process is completed, the piston is relieved. The filling material expands, and the cartridge deforms back again. Since the filling material in the area of the piston is compressed, further filling material flows out of the dispensing opening of the cartridge. In addition to this undesirable effect, air can penetrate from the rear of the cartridge into the interior of the cartridge through a gap between the inner wall of the cartridge and the sealing lip. The filling material may then react with the penetrated air or water vapor in the area of the piston and harden.

SUMMARY

The present disclosure provides systems, apparatuses, and methods relating to sealing and dispensing pistons.

In some examples, a sealing and dispensing piston for insertion into an interior of a cartridge includes: a piston plate configured to contact a filling substance disposed in the interior of the cartridge; a skirt section adjoining a rear of the piston plate; and a front lamella extending forward from the skirt section to form a space between the front lamella and a front portion of the skirt section, wherein the front lamella has a sealing surface configured to abut against an inner surface of a wall of the cartridge; wherein the sealing surface is configured to form a seal between the inside of the wall of the cartridge and the piston, such that the sealing surface elastically abuts the inside of the wall to prevent the filling substance from passing through the area between the front lamella and the inside of the wall, wherein the front lamella is at least one of elastically designed and mounted in such a way that the piston automatically moves backwards or forwards along the wall of the cartridge when an overpressure or underpressure is generated due to expansion, shrinkage, or movement of the filling substance.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 2 is a side view of the embodiment of the piston according to the present disclosure;

FIG. 7 is a cross-sectional view of the piston of FIGS. 1-6 inserted into an illustrative cartridge.

DETAILED DESCRIPTION

Figure 1:
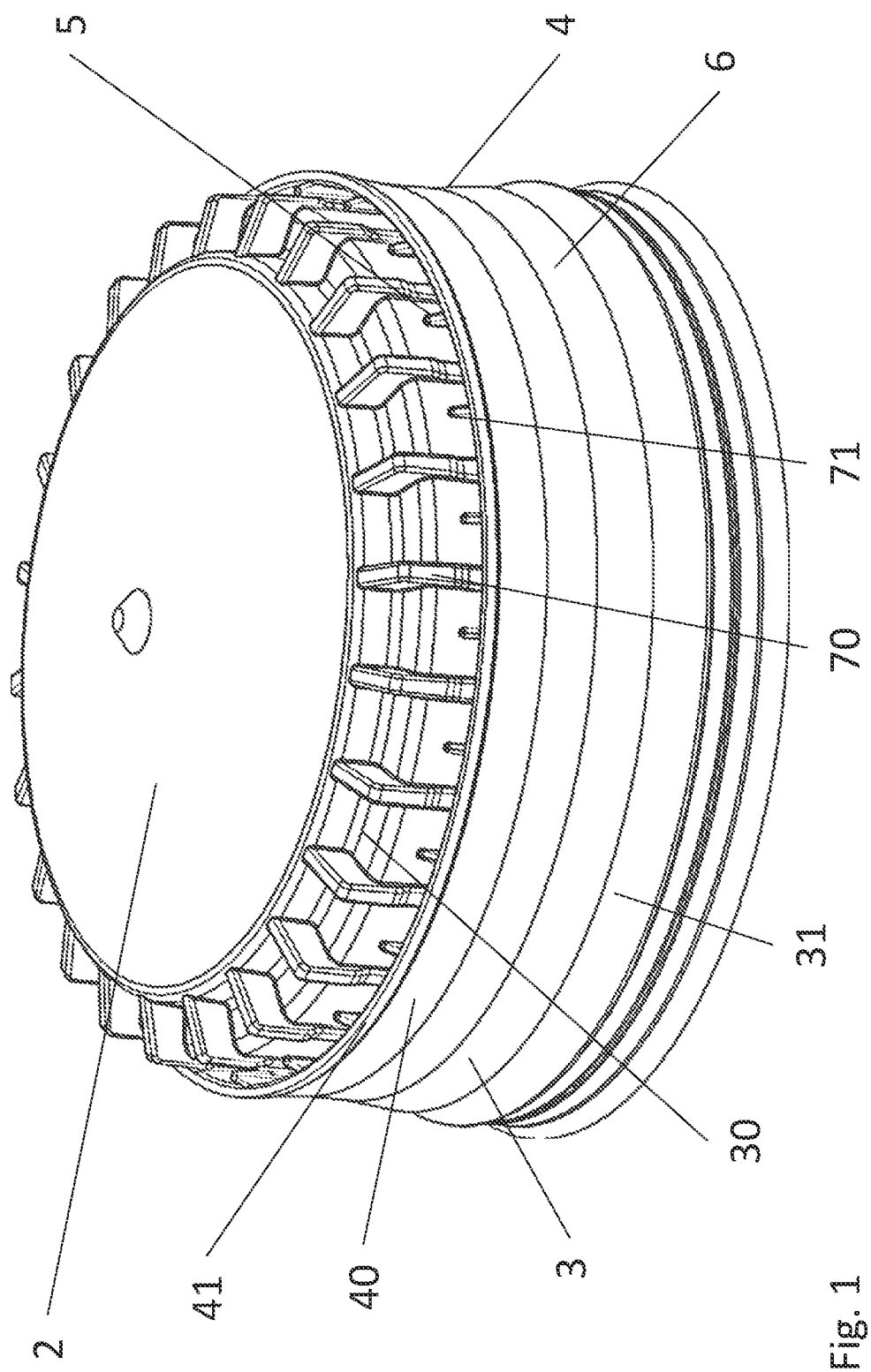
FIG. 1 is a perspective view of an embodiment of a piston according to the present disclosure.

Various aspects and examples of a sealing and dispensing piston having novel features, as well as related methods, are described below and illustrated in the associated drawings. Unless otherwise specified, a piston in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," "rearward," and the like are intended to be understood in the context of a host cartridge into which systems described herein may be inserted or otherwise installed. For example, "forward" means toward the front portion or dispensing end of the cartridge, and "rearward" means toward the rear of the cartridge. In the absence of a host cartridge, the same directional terms may be used as if the cartridge were present. For example, even when viewed in isolation, a device may have a "front" or "forward" end, based on the fact that the device would be installed with the end in question facing in the direction of the front portion of the cartridge. Accordingly, in general, the terms "forward," "rearward," "front," "rear," "rear side," "front side," etc., are in reference to the direction of movement of the piston when the paste or liquid filling substance is discharged as intended.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Providing," in the context of a method, may include receiving, obtaining, purchasing, manufacturing, generating, processing, preprocessing, and/or the like, such that the object or material provided is in a state and configuration for other steps to be carried out.

Overview

The present disclosure provides a sealing and dispensing piston for cartridges for filling substances, which allows good centering and guidance of the piston movement, and prevents an undesirable flow of filling substance through the dispensing opening of the cartridge when the dispensing operation is interrupted or stopped.

This is achieved by providing a sealing and dispensing piston (or "plunger," which term may be used synonymously) for cartridges filled with filling material, for example filled with a plastic material.

A sealing and dispensing piston of the present disclosure is configured for insertion into the interior of a cartridge. The piston includes a piston plate for contact with a pasty or liquid filling substance filled in the interior of the cartridge, a skirt section adjoining the rear of the piston plate, and a front lamella extending forwardly in a predetermined length from the skirt section to form a space between the front lamella and a front portion of the skirt section. The front lamella has a sealing surface for abutment against the inside of a wall of the cartridge. This sealing surface for sealing between the inside of the wall of the cartridge and the piston elastically abuts the inside of the wall in order to prevent the filling substance from passing through a region between the front lamella and the inside of the wall. The front lamella is elastic and/or it may be elastically supported such that the piston moves along the wall of the cartridge when the pressure of the filling substance exceeds an overpressure or falls below an underpressure generated by expansion, shrinkage, or movement of the filling substance. The piston automatically moves backwards or forwards along the wall of the cartridge.

The piston can be regarded as a "trailing" piston, in that the piston automatically adapts to the pressure conditions of the enclosed filling substance, and compensates for pressure changes by moving forwards or backwards. This effect is achieved, without limitation, by the high sliding properties and the arrangement of several sealing lips and their elasticity. For example, three to five seals or sealing lips can be arranged at the outer side of the piston axially spaced from each other. Since the sealing lips also support the piston and thus prevent it from tilting without exerting too much friction, the piston remains movable and does not get caught at the inner wall of the cartridge.

In particular, the front lamella is designed in such a way that when the front of the piston comes into contact with the filling substance, an outwardly directed force is exerted on the front lamella so that it seals automatically. This effect is achieved by filling substance penetrating into the gap between the lamella and the piston plate and exerting a hydrostatic pressure on the lamella. Accordingly, the lamella is directed and moved towards the cartridge wall.

In some examples, the piston has at least a first rear sealing lip extending in the region of a rear end of the skirt section or formed by the rear end of the skirt section, the first rear sealing lip resiliently abutting the wall of the cartridge for sealing between the inner side of the wall of the cartridge. The first rear sealing lip being configured to be automatically urged outwardly when acted upon by air from the rear side of the piston.

In some examples, the piston has at least one second rear sealing lip which extends at a distance (x) ahead from the rear end of the skirt section, the second rear seal bearing elastically against the wall of the cartridge for sealing with the inner side of the wall of the cartridge. The second rear sealing lip is designed in such a way that it is automatically pressed outwards from the rear of the piston when acted upon by air.

The piston may further comprise at least one rear lamella extending rearwardly from the skirt section, the rear lamella having a sealing surface for abutting the inside of a wall of the cartridge, the sealing surface resiliently abutting the inside of the wall for sealing between the inside of the wall of the cartridge and the piston, in order to prevent a fluid, such as in particular air or gas, from passing from the rear side of the piston between the rear lamella and the inner side of the wall. The rear lamella is designed in such a way that it is automatically pushed outwards when acted upon by the fluid from the rear side of the piston.

The skirt section is configured to be substantially hollow cylindrical, and/or the piston is configured to be inserted into a substantially cylindrical interior space of a cartridge.

The front lamella may have an edge from which a plurality of projections facing the axis of the piston extend, wherein the projections project forwardly beyond the front end of the front lamella and each of the projections forms a radially outwardly facing ramped surface extending obliquely rearwardly and merging with the edge of the front lamella. The oblique ramped surfaces are configured to center the piston when it is inserted into the cartridge, i.e., the piston centers itself automatically. The term "radial" also includes surfaces with a radial component.

At least one of the projections may have an inner end that terminates at a distance from the skirt section to form a space between the skirt section and the end of the projection. In this manner, flexibility and elasticity of the lamella is facilitated. The elasticity of the lamella is not reduced, since the projections do not form connecting webs between the lamella and the piston plate.

The protrusions are configured such that they do not impede the elastic mobility and pliability of the lamella. At the same time, the rear end of the wall of the cartridge, i.e., the rear end of the wall, is reliably prevented from getting between the lamella and the piston plate when setting the piston. The projections may be arranged equidistantly or at different intervals in the circumferential direction.

In some examples, wax is used to increase the lubricity of the piston within the inner space of the cartridge. For this purpose, the tip of the front lamella may be formed or profiled such that a gap is formed between the tip of the lamella and the inside of the cartridge wall, which gap may serve as a reservoir for wax or other lubricant.

When the piston is inserted into the cartridge for the first time, the space between the filling substance and the piston plate must be vented. This can be done through any possible venting or valve openings known in the prior art.

Venting may also be facilitated by providing or forming or generating a gap between the inner side of the wall of the cartridge and the sealing lips or lamella of the piston, e.g., by deformation of the piston during the process of setting the piston. For example, the piston may have ribs extending from the rear which are arranged asymmetrically. A setting punch may engage or push the ribs in such a way that the piston deforms asymmetrically during setting, allowing venting at certain points around the circumference of the piston. When the setting operation is complete, the piston relaxes and resumes its original round shape, thereby eliminating the gaps. The design according to the present disclosure, with a series of sealing lips spaced along the height (i.e., spaced in an axial direction) of the piston, provides stabilization of the piston in its position against the cartridge wall, and compensates for any remaining "out-of-roundness" of the piston.

For example, the piston plate can have an inner, approximately cylindrically recessed ring shoulder on its rear side, against which the setting tool engages with its axial pressing pressure when the piston is inserted into the rear end of the cartridge. In addition, a ring projection extending obliquely backwards and inwards is formed in the area of the rear of the piston plate, against which the setting punch engages when the cartridge is pressed out.

If, on the other hand, the piston is seated too tightly, it is not possible for the piston to move sufficiently in the direction of the filled substance when, for example, the filled substance cools down, shrinks and the enclosed volume (enclosed by the wall of the cartridge and the piston) is reduced as a result. The consequence of the shrinkage is that the container bulges. This is prevented by the piston of the present disclosure, since the piston may "follow" the substance moving away from the piston plate when it shrinks.

Examples, Components, and Alternatives

The following sections describe selected aspects of illustrative sealing and dispensing pistons, as well as related systems and/or methods. The examples in these sections are intended for illustration and should not be interpreted as limiting the scope of the present disclosure. Each section may include one or more distinct embodiments or examples, and/or contextual or related information, function, and/or structure.

FIGS. 1 to 6 show an embodiment of a sealing and dispensing piston 1 in various views. FIG. 7 depicts a cross-sectional view of the sealing and dispensing piston 1 inserted into a cartridge 9.

The piston 1 has a domed piston plate 2 and a substantially cylindrical skirt section 3. The skirt section 3 joins the piston plate 2 at the rear end thereof, i.e., the skirt section 3 extends from the piston plate 2 towards a rearward direction. The skirt section 3 has a first section 30 which immediately adjoins the piston plate 2, and a second section 31 which adjoins the first section 30 and whose end 310 forms the rear end of the piston 1.

The first section 30 of the skirt section 3, which adjoins the piston plate 2, has a first axial section 300, a step 301 extending radially outwardly (i.e., away from the central axis A) from the first axial section 300, and a second axial section 302 extending to the transition region 32. Adjacent to the transition region 32 are a front lamella 4 and a rear lamella 6.

Extending from a transition region 32 between the first section 30 and the second section 31 is the forwardly oriented front lamella 4 having a lamella body 40 and a front lamella edge 41. The front lamella 4 may have a front sealing lip or sealing surface 42 disposed in the region of the lamella edge 41 or on the outside of the lamella body 40, but preferably in the front region thereof. The lamella 4 is formed to be elastic and/or mounted or connected to the skirt section 3 in such a way that—after the piston 1 has been introduced into an internal space M of cartridge 9—it exerts a force directed towards the inside 900 of the wall 90 of the cartridge, so that the sealing lip or the sealing surface 42 bears or presses against the wall 90 to ensure a seal with respect to the filling substance.

A gap 5 of depth (t) is formed between the first section 30 of the skirt section 3 and the lamella 4. Filling substance can penetrate into this space when the piston 1 is set and/or during dispensing, and press the lamella 4 outwards towards the inside of the wall of the cartridge. In this way, a sealing effect can be reinforced and enhanced.

In addition, the contour of the lamella edge 41 and/or the sealing lip/sealing surface 42 can be designed and shaped in such a way that the lamella 4 is pressed outwards with an outwardly directed force component under the influence of the pressure exerted on it by the filling substance. This improves the seal between piston 1 and cartridge with respect to the filling substance. A leakage of filling substance through a gap between lamella 4 and cartridge wall is thus prevented. Since the lamella 4 moves outward when the piston 1 is inserted into the cartridge or is pressed outward by fluid or filling substance (from the front), the lamella 4 has a self-sealing and self-centering effect.

A rear lamella 6 is connected to the rear of the front lamella 4, also extending from the transition area 32. Analogous to the front lamella 4, the rear lamella 6 has a lamella body 60 and a lamella edge 61. The lamellar edge 61 forms or has a lamellar seal that runs around uninterruptedly in the circumferential direction. The lamellar seal 61 acts to prevent air located at the rear of the piston 1 from entering the space between the piston 1 and the wall of the cartridge. Since the rear lamella 6 is elastically formed or elastically supported and extends obliquely rearwardly and outwardly, the lamellar seal 61, when a fluid is applied to it from the rear side of the piston 1, is pressed outwardly and thus has a self-sealing and, at the same time, self-centering effect.

Figure 4:
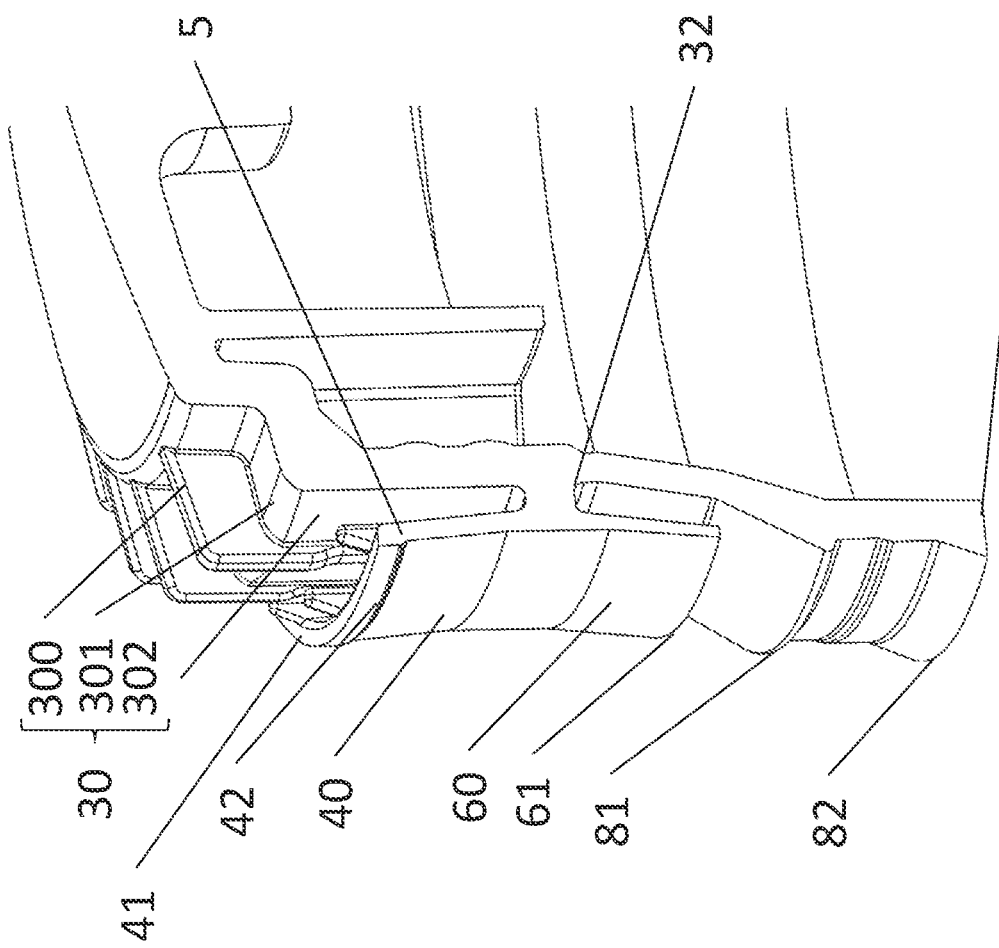
FIG. 4 is a sectional view of the piston, taken at line A in FIG. 1, according to the present disclosure.
Figure 3:
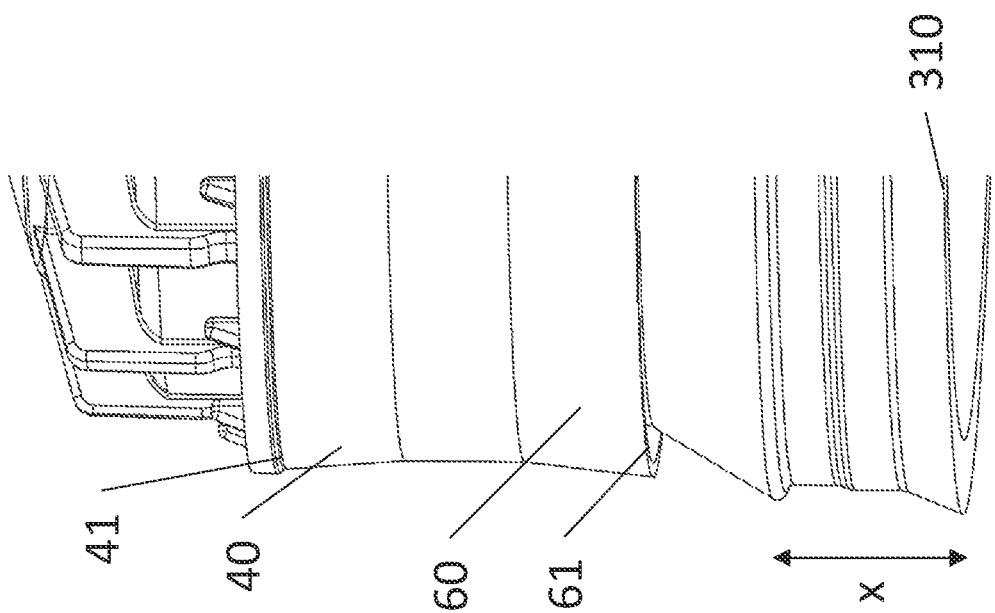
FIG. 3 is a partial view of the piston of FIG. 2.
Figure 6:
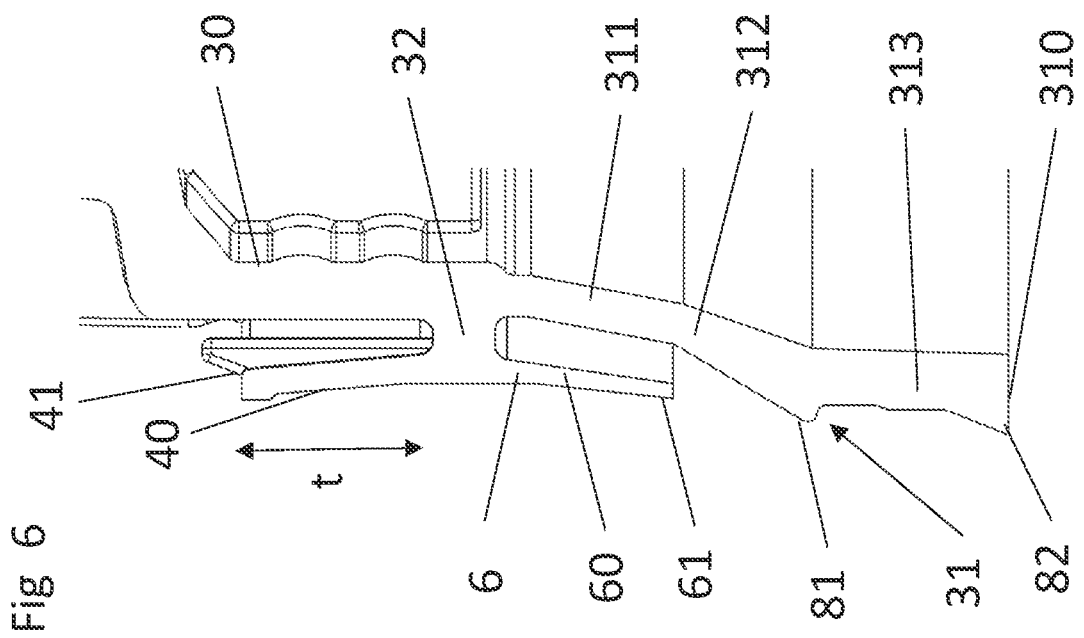
FIG. 6 is a further sectional view of the piston according to the present disclosure.
Figure 5:
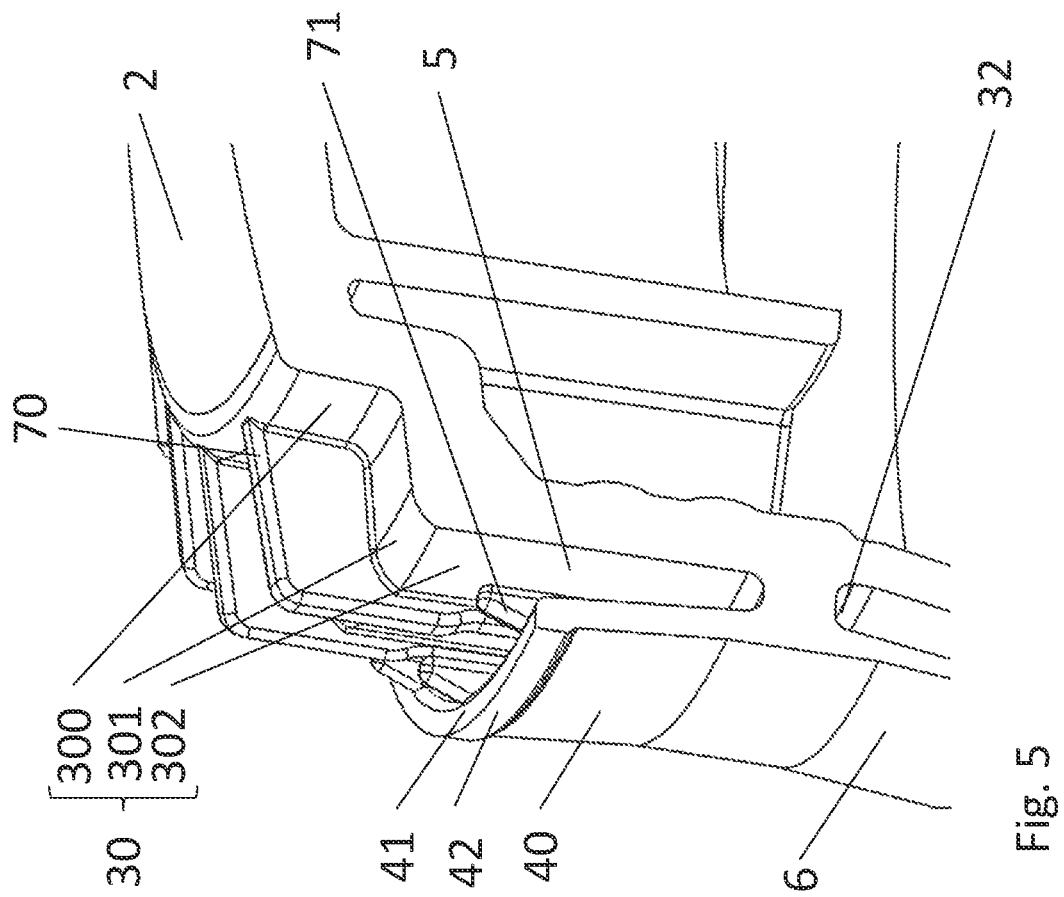
FIG. 5 is a detail view taken from FIG. 4.

The front area of the piston 1 will be described in more detail, particularly with reference to FIGS. 4 to 6. In order to center the piston 1 when it is placed in a cartridge and to prevent damage to the flexible front lamella 4, the piston has, on the one hand, guide ribs 70 extending outwardly from the piston plate 2. The guide ribs 70 are arranged spaced apart from one another (in particular equidistantly) along the circumference. They do not extend to the front lamella 4, i.e., a gap 5 remains between the guide ribs 70 and the front lamella 4.

In addition, the piston 1 has centering ribs 71 which extend inwardly from the edge 41 of the front lamella 4. In addition, each of at least a plurality of the centering ribs 71 has a front ramp surface which, viewed from the outside inwards, extends obliquely axially forwards. The centering ribs 71 extend inwardly, in particular radially inwardly. Where appropriate, they are arranged equidistantly along the circumference. However, they do not extend as far as the skirt section 3, so that a gap 5 remains between the inner ends of the centering ribs 71 and the skirt section 30. The centering ribs 71 ensure that the edge of a rear end 91 of the cartridge 9 which hits the ramp surfaces when the piston 1 is set slides relatively outwards. In this way, the piston 1 is centered, i.e., it is self-centering.

The gap 5, located both between the guide ribs 70 and the lamella 4 and between the centering ribs 71 and the skirt section 3 ensures that the elastic or elastically mounted lamella 4 remains flexible. The sealing function is ensured both by a force pushing the lamella outwards and by the function of trailing by the piston 1 in the event of changes in the density of the filling substance or when the filling substance flows within the cartridge. In other words, the piston ensures good sealing properties and, in order to compensation pressure differences, follows a movement of the filled substance.

The second section 31 of the skirt section 3 has a front section 311 which extends approximately parallel to the rear lamella 6 and is approximately cylindrical in shape. In addition, the second section 31 of the skirt section 3 has a central section 312 that adjoins the front section 311 and extends outward at a slight angle to establish a first sealing lip 81. The middle section 312 is joined by an end section 313, the free end 310 of which (the free end of the skirt section 3) forms a second sealing lip 82.

On the one hand, the sealing lips 81 and 82 perform a sealing function which prevents air or gas (for example, when the piston is actuated by compressed air) from passing past the second seal 82 from the rear of the piston 3. Should this nevertheless happen, the first seal 81 acts in such a way that it also seals against the penetration of fluid from the rear to the front of the piston 3.

Both seals 81 and 82 are of elastic design or elastically mounted and extend obliquely to the rear and outside. Thus, when a fluid is applied to these sealings from the rear of the piston 1, they have a self-sealing and at the same time a self-centering property.

The angular position of the sealing lips 81 and 82 is between 5° and 45°, in particular between 10° and 30° relative to the central axis A. The sealings can be designed, for example, as sealing lips, as skirt sections extending obliquely backwards and outwards, or as lamellae. Since the sealing lips 81 and 82 are pressed outward when a fluid is applied to them, they also act as support lips and prevent the piston 1 from tilting when it is set and when it is moved.

As a result of the fact that the lamellae 4 and 6 and the sealings 81 and 82 are of elastic design, the piston trails when the filling substance in the region of the piston plate 2 or the front of the piston generates a negative pressure or a positive pressure or expands or contracts. This can occur, for example, by deformation of the cartridge when the filling substance is dispensed or when the dispensing process is terminated. For example, the piston trails as the filled substrate (e.g., a sealing substance) contracts. For example, when the piston is actuated with a dispensing gun, the compressed mass expands again when the actuating pressure is reduced. Whereas with conventional pistons this causes filling compound to leak out at the front discharge opening 92 of the cartridge 9, the piston 1 according to the invention is pushed backwards by the expanding filling compound, thus preventing undesirable leakage through the cartridge discharge opening. The invention thus provides a piston that may be characterized as a trailing, "following" or compensating piston.

The high elasticity of the lamellae 4, 6 and the sealing lips 81, 82 and the associated high axial mobility of the piston 1 while, at the same time, stabilizing the "roundness" and the position of the piston 1 in the cartridge (bearing stability) prevent air from being sucked in a space between the filling substance and the piston 1, as would happen if the piston were not sufficiently mobile. The lamellae 4, 6 and the sealing lips 81, 82 thus act in a dual function, namely, as seals and as support elements, preventing the piston from tilting or being deformed out of round. Furthermore, in particular the second seal 82 is more stable and out-of-roundness can be compensated for. Consequently, the piston 1 as a whole is "rounder."

In addition to the aforementioned design measures, the space between the piston 1 and the inner wall of the cartridge can be provided with a lubricant, for example with wax, in order to further increase the mobility of the piston 1. For this purpose, a lubricant/wax reservoir can be formed at the lamellar edge 41 of the front sealing lip 4, for example between the sealing surface 42 and the front lamellar edge 41, for example in the form of a groove extending around the outside at the front of the lamellar edge 41. The groove is delimited by the cartridge inner wall and the lamellar edge 41.

The rear sealing lips 81, 82 and the rear lamellar seal 61 are arranged in an approximately equidistant manner (distance x) in order to reliably prevent tilting of the piston 1.

The following describes additional aspects and features of self-centering and self-sealing dispensing pistons, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A sealing and dispensing piston (1) for insertion into the interior of a cartridge, comprising:

a piston plate (2) for contact with a pasty or liquid filling substance filled in the interior of the cartridge;

a skirt section (3) adjoining the rear of the piston plate (2); and a front lamella (4) extending forwardly in a length (t) from the skirt section (3) to form a space between the front lamella (4) and a front portion (30) of the skirt section (3), the front lamella (4) having a sealing surface (42) for abutment against the inner surface of a wall of the cartridge;

wherein said sealing surface (42) for sealing between the inside of the wall of the cartridge and the piston (1) elastically abuts the inside of the wall to prevent the filling substance from passing through the area between the front lamella (4) and the inside of the wall, wherein the front lamella (4) is at least one of elastically designed and mounted in such a way that the piston (1) automatically moves backwards or forwards along the wall of the cartridge when an overpressure or underpressure due to expansion, shrinkage or movement of the filling substance is generated.

A1. The sealing and dispensing piston (1) according to A0, wherein the front lamella (4) is designed in such a way that when the front of the piston (1) comes into contact with the filled-in substance, an outwardly directed force is exerted on the front lamella (4).

A2. The sealing and dispensing piston (1) according to A0 or A1, wherein the piston (1) has at least one first rear sealing (82) which extends in the region of a rear end (310) of the skirt section (3) or is formed by the rear end (310) of the skirt section (3), the first rear sealing (82) bearing elastically against the wall of the cartridge for sealing between the inside of the wall of the cartridge and being designed in such a way that it is automatically pressed outwards when a fluid coming from the rear of the piston (1) acts to it.

A3. The sealing and dispensing piston according to any one of paragraphs A0 through A2, wherein the piston (1) has at least one second rear sealing (81) which extends from the skirt section (3) at an axial position which is spaced at a distance (x) from the rear end (310) of the skirt section (3), the second rear sealing (81) bearing elastically against the wall of the cartridge for sealing against the inner side of the wall of the cartridge and being designed in such a way that it is automatically pressed outwards when a fluid coming from the rear of the piston (1) acts to it.

A4. The sealing and dispensing piston (1) according to any one of paragraphs A0 through A3, wherein the piston (1) has at least one rear lamella (6) extending rearwardly from the skirt section (3), the rear lamella (6) having a sealing surface for abutment against the inside of a wall of the cartridge, the sealing surface for sealing between the inside of the wall of the cartridge and the piston (1) elastically abutting the inside of the wall to prevent a fluid from passing from the rear side of the piston (1) between the rear lamella (6) and the inside of the wall, wherein the rear lamella (6) is formed such that it is automatically pressed outwards when a fluid coming from the rear of the piston (1) acts to it.

A5. The sealing and dispensing piston (1) according to any one of paragraphs A0 through A4, wherein the skirt section (3) is substantially hollow cylindrical, and/or the piston (1) is designed for insertion into a substantially cylindrical interior space of a cartridge.

A6. The sealing and dispensing piston (1) according to any one of paragraphs A0 through A5, wherein the front lamella (4) has a lamella edge (41) from which a plurality of projections (71) extend facing the piston axis (A), which projections project forward beyond the front end of the front lamella (4) and at least a plurality of the projections form an outwardly facing ramp surface extending obliquely rearwardly and merging into the lamella edge (41).

A7. The sealing and dispensing piston (1) according to A6, wherein at least one of the projections (71) has an inner end terminating at a distance from the skirt section (3) in order to form a gap (5) between the skirt section (3) and the end of the projection (71).

A8. The sealing and dispensing piston (1) according to any one of paragraphs A0 through A7, wherein a lamellar edge (41) of the front lamella (4) is formed or profiled so as to form a gap between the lamellar edge (41) and the inside of the cartridge wall, which gap is provided as a reservoir for lubricant.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A sealing and dispensing piston for insertion into an interior of a cartridge, the piston comprising:
    a piston plate configured to contact a filling substance disposed in the interior of the cartridge;
    a skirt section adjoining a rear of the piston plate;
    a front lamella extending forward from the skirt section to form a space between the front lamella and a front portion of the skirt section, wherein the front lamella has a sealing surface configured to abut against an inner surface of a wall of the cartridge;
    at least one first rear sealing lip extending in the region of a rear end of the skirt section or is formed by the rear end of the skirt section, the first rear sealing lip configured to bear elastically against the wall of the cartridge to seal against the inside of the wall of the cartridge and configured to automatically press outward when acted upon by a fluid coming from the rear of the piston; and
    at least one second rear sealing lip extending from the skirt section at an axial position spaced from the rear end of the skirt section, the second rear sealing lip configured to bear elastically against the wall of the cartridge to seal against the inner side of the wall of the cartridge and configured to automatically press outward when acted upon by a fluid coming from the rear of the piston;
    wherein the sealing surface is configured to form a seal between the inside of the wall of the cartridge and the piston, such that the sealing surface elastically abuts the inside of the wall to prevent the filling substance from passing through the area between the front lamella and the inside of the wall;
    wherein the front lamella is at least one of elastically designed and mounted in such a way that the piston automatically moves backwards or forwards along the wall of the cartridge when an overpressure or underpressure is generated due to expansion, shrinkage, or movement of the filling substance; and wherein the front lamella has a lamella edge from which a plurality of projections extend toward a central axis of the piston, and the projections project forward beyond the front end of the front lamella, and the plurality of the projections form an outwardly facing ramp surface extending obliquely rearwardly and merging into the lamella edge.

2. The sealing and dispensing piston according to claim 1, wherein the front lamella is configured such that when the front of the piston comes into contact with the filling substance, an outwardly directed force is exerted on the front lamella.

3. The sealing and dispensing piston according to claim 1, wherein the piston has at least one rear lamella extending rearwardly from the skirt section, the rear lamella having a second sealing surface configured to abut against the inside of the wall of the cartridge, and wherein the second sealing surface is configured to seal between the inside of the wall of the cartridge and the piston, such that the second sealing surface elastically abuts the inside of the wall to prevent a fluid from passing from the rear side of the piston between the rear lamella and the inside of the wall, wherein the rear lamella is configured to automatically press outward when acted upon by a fluid coming from the rear of the piston.

4. The sealing and dispensing piston according to claim 1, wherein:

the skirt section is substantially hollow and cylindrical.

5. The sealing and dispensing piston according to claim 1, wherein at least one of the projections has an inner end terminating at a distance from the skirt section to form a gap between the skirt section and the end of the projection.

6. The sealing and dispensing piston according to claim 1, wherein the piston is configured to be inserted into a substantially cylindrical interior space of a cartridge.

7. The sealing and dispensing piston according to claim 6, wherein the outwardly facing ramp surface is configured to center the piston when the piston is inserted into the interior of the cartridge.

* * * * *